(12) United States Patent
Okazaki et al.

(10) Patent No.: US 7,802,597 B2
(45) Date of Patent: Sep. 28, 2010

(54) PRESS APPARATUS

(75) Inventors: Shizuaki Okazaki, Hiroshima (JP); Hideki Kondo, Hiroshima (JP); Ryoji Yumito, Hiroshima (JP)

(73) Assignee: Kitagawa Seiki Kabushiki Kaisha, Hiroshima (JP)

( * ) Notice: Subject to any disclaimer, the term of this patent is extended or adjusted under 35 U.S.C. 154(b) by 481 days.

(21) Appl. No.: 11/903,977

(22) Filed: Sep. 25, 2007

(65) Prior Publication Data

US 2008/0083503 A1    Apr. 10, 2008

Related U.S. Application Data

(63) Continuation-in-part of application No. PCT/JP2006/304066, filed on Mar. 3, 2006.

(30) Foreign Application Priority Data

Mar. 25, 2005   (JP) ............................. 2005-090033

(51) Int. Cl.
*B32B 37/00* (2006.01)

(52) U.S. Cl. ..................... 156/358; 156/382; 156/498; 156/538; 156/583.1

(58) Field of Classification Search ................ 156/358, 156/359, 382, 499, 538, 539, 556, 580, 581, 156/583.1, 498; 100/315, 319, 323, 324, 100/325, 326
See application file for complete search history.

(56) References Cited

U.S. PATENT DOCUMENTS

2003/0042294 A1   3/2003  Matsumoto et al.

2003/0056725 A1 *   3/2003  Ueyama et al. ............ 118/712

FOREIGN PATENT DOCUMENTS

| CN | 1406743 | 4/2003 |
|---|---|---|
| JP | 61-76301 | 4/1986 |
| JP | 61-176258 | 11/1986 |
| JP | 1-109400 | 7/1989 |
| JP | HEI 1-109400 | 7/1989 |
| JP | 6-143084 | 5/1994 |
| JP | 2000-317700 | 11/2000 |
| JP | 2002-321239 | 11/2002 |
| JP | 2002-353086 | 12/2002 |
| JP | 2003-145300 | 5/2003 |
| JP | 2003-205399 | 7/2003 |
| JP | 2003-260600 | 9/2003 |

\* cited by examiner

*Primary Examiner*—James Sells
(74) *Attorney, Agent, or Firm*—Day Pitney LLP

(57) ABSTRACT

A press apparatus includes upper and lower heating plates arranged in a vertical direction to hot-press the product therebetween, a fixed platen to which the upper heating plate is fixed, a movable platen to which the lower heating plate is fixed, a movable platen driving unit configured to move the movable platen along the vertical direction with respect to the fixed platen, an upper cooling plate, a lower cooling plate, the upper and lower cooling plates being arranged in the vertical direction to cold-press the product therebetween, and a cooling plate driving unit moving the upper and lower cooling plates in a horizontal direction between a first position for cold pressing that is located between the upper and lower heating plates and a second position for hot pressing that is located apart from the upper and lower heating plates in the horizontal direction.

23 Claims, 13 Drawing Sheets

PRESS APPARATUS

CROSS-REFERENCE TO RELATED APPLICATION

This is a Continuation-in-Part of International Application No. PCT/JP2006/304066 filed on Mar. 3, 2006, which claims priority from Japanese Patent Application No. 2005-090033 filed on Mar. 25, 2005. The entire disclosure of the prior applications is incorporated herein by reference.

BACKGROUND

1. Field of the Invention

The present invention relates to a press apparatus configured to press a workpiece placed between a pair of heating plates. Specifically, the present invention relates to a press apparatus configured to execute both hot pressing and cold pressing for a single workpiece.

2. Related Art

Conventionally, a laminate molded product is produced by pressing a workpiece made of material such as resin material and copper foil (hereinafter referred to as a "product," which includes a molded product after the pressing) between a pair of heating plates with high temperature (hot pressing), and then, by pressing the product between a pair of cooling plates with low temperature (cold pressing). For example, Japanese Patent Provisional Publication No. 2003-205399 (hereinafter referred to as '399 Publication) discloses a press apparatus configured to control the temperature of plates within a range of a room temperature to a temperature for molding (e.g. several hundred degrees C.), so that the plates can serve as both the heating plate and cooling plate.

The press apparatus disclosed in the '399 Publication has an advantage that the size of the entire apparatus could be reduced, since the hot pressing and the cold pressing are executed in a single press apparatus. However, since the temperature of the plates of the press apparatus disclosed in '399 Publication is varied between the room temperature and the several hundred degrees C., it takes time to change the temperature of the plates to an intended temperature when a plurality of products are pressed successively, and it causes inefficiency of manufacturing the products.

Additionally, Japanese Patent Provisional Publication No. SHO 61-76301 (hereinafter referred to as '301 Publication) discloses a tandem press system that is provided with a hot pressing apparatus, a cold pressing apparatus and a carrying means for carrying a product between the hot pressing apparatus and the cold pressing apparatus. In the tandem press system disclosed in '301 Publication, since the hot pressing and the cold pressing are performed with different respective pressing apparatuses, the heating plates of the hot pressing apparatus and the cooling plates of the cold pressing apparatus have only to be maintained at a molding temperature and room temperature, respectively. Therefore, in the above tandem press system, the temperature of each of the heating plates and cooling plates is not significantly varied even when a plurality of products are pressed in series. However, unfortunately, the tandem press system, which uses two separate pressing apparatuses, has a large size of the entire system.

SUMMARY OF THE INVENTION

The present invention is advantageous in that there is provided an improved press apparatus that makes it possible to perform both hot pressing and cold pressing for a product with the same level of speed as a tandem press system without making the apparatus large-sized.

According to an aspect of the invention, there is provided a press apparatus capable of hot pressing and cold pressing for a product, which includes upper and lower heating plates arranged in a vertical direction to hot-press the product therebetween, a fixed platen to which the upper heating plate is fixed, a movable platen to which the lower heating plate is fixed, a movable platen driving unit configured to move the movable platen along the vertical direction with respect to the fixed platen, an upper cooling plate, a lower cooling plate, the upper and lower cooling plates being arranged in the vertical direction to cold-press the product therebetween, and a cooling plate driving unit configured to move the upper and lower cooling plates in a horizontal direction between a first position for the cold pressing that is located between the upper and lower heating plates and a second position for the hot pressing that is located apart from the upper and lower heating plates in the horizontal direction.

According to the above configuration, the cold pressing can be performed after the hot pressing by inserting the cooling plates between the heating plates such that the product is cold-pressed between the cooling plates to which pressing pressure is applied via the heating plates. Thus, the press apparatus according to the present invention can be downsized since only one pressing mechanism is employed for both the hot pressing and the cold pressing. Additionally, since the heating plates and the cooling plates are provided as separate members, it is not required to change the temperature of the heating plates (cooling plates) between a molding temperature and room temperature. Hence, the hot pressing and cold pressing can alternately and continuously be performed. Especially, when a plurality of products are pressed in series by the press apparatus according to the present invention, molding time for one product can be made as short as that by the tandem press system.

BRIEF DESCRIPTION OF THE ACCOMPANYING DRAWINGS

DETAILED DESCRIPTION OF THE EMBODIMENT

Figure 1:
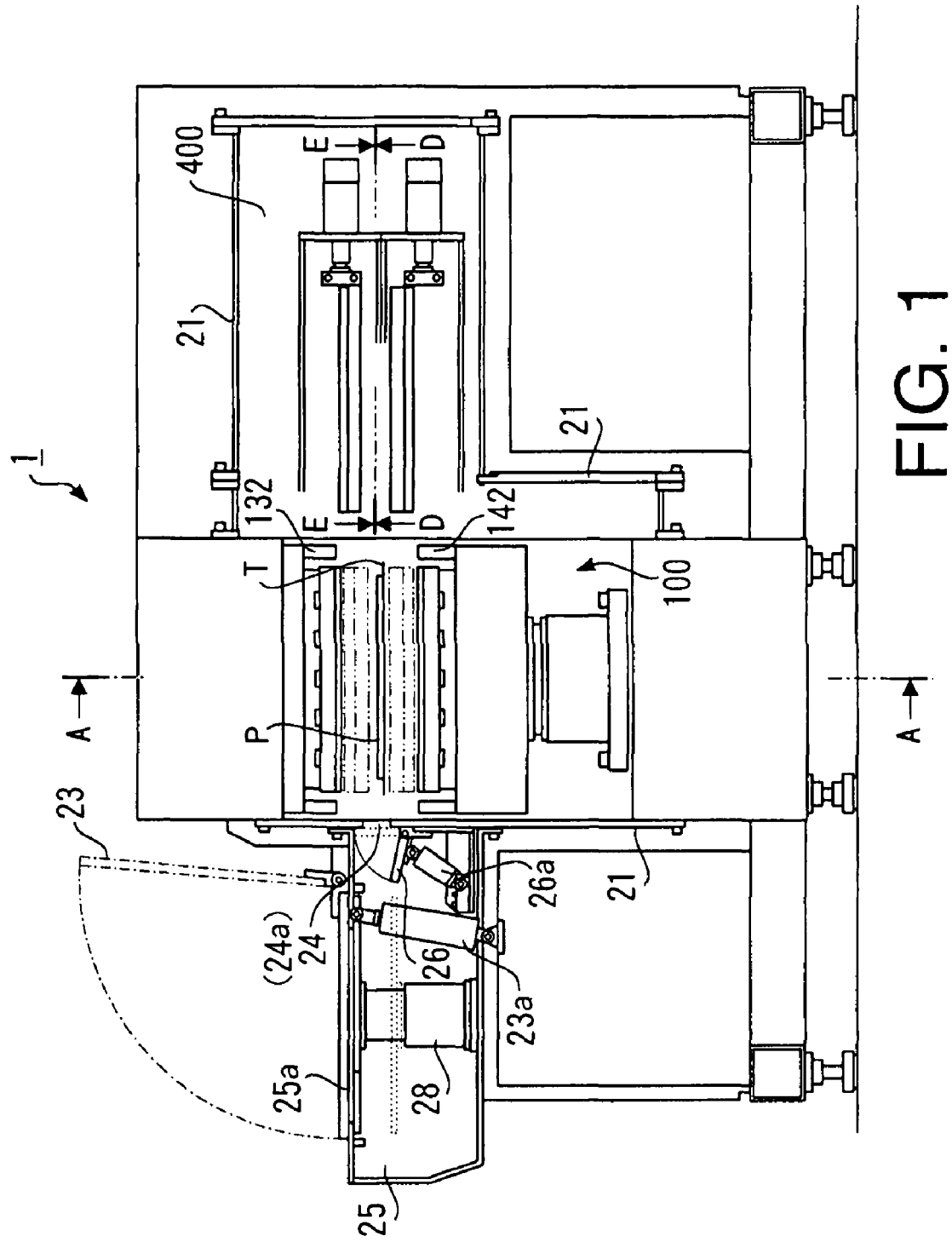
FIG. 1 is an elevational view of a press apparatus in a first embodiment according to a present invention.

Referring to the drawings, illustrative embodiments will be described. FIG. 1 is an elevational view of a press apparatus in a first embodiment according to the present invention.

The press apparatus 1 in the first embodiment is configured to press a product P including laminated resin materials and copper circuit patterns. The product P is pressed between heating plates heated to a molding temperature for the resin material (hot pressing), and then, pressed between the cooling plates with a room temperature (cold pressing). It is noted that the product P is placed on a tray T and pressed together with the tray T.

The hot pressing and the cold pressing are executed in an atmosphere that is substantially depressurized to a vacuum state. Therefore, a first section around a press body 100 including the heating plate and cooling plate and driving mechanisms thereof is surrounded with a frame 21 as airtight walls.

Additionally, a second section which is also surrounded with airtight walls is formed adjacent to the first section at a left side in FIG. 1. The second section serves as a decompression room 25 having a decompression pump (not shown) separated from the first section by a partition 24. The decompression pump depressurizes the decompression room 25 substantially to the vacuum state.

The top surface of frames of the decompression room 25 has an opening 25a to allow the product P to be taken in and out of the press apparatus therethrough. Additionally, the partition 24 has an opening 24a to allow the tray T and the product P thereon to be transferred between the first section (press body 100) and the decompression room 25 through the opening 24a.

Additionally, there is an inner door 26 which is openable and closable by driving a cylinder 26a on the opening 24a. The tray T and product P thereon can be moved between the first section and the decompression room 25 only when the inner door 26 is opened. On the other hand, when the inner door 26 is closed, the first section around the press body 100 is completely sealed off from the outside thereof and the decompression room 25. Then, the inner door 26 is controlled to open only when the decompression room 25 is substantially depressurized to the vacuum state so that the first section can always be kept substantially in the vacuum state.

Further, there is an outer door 23 which is openable and closable by driving a cylinder 23a on the opening 25a of the top surface of the decompression room 25. When the outer door 23 is closed, the opening 25a is covered with the outer door 23, thereby sealing the decompression room 25 from the outside of the decompression room 25. In this condition, the decompression room 25 is depressurized by driving the decompression pump.

The tray T with the product P placed thereon is taken in the decompression room 25 through the opening 25a when the outer door 23 is opened. Then, after the outer door 23 is closed, the tray T and product P thereon are carried to the press body 100 in the first section by a carrying mechanism described later. After the product P is pressed, the tray T and pressed product P thereon are carried to a predetermined position beneath the opening 25a, and then the outer door 23 is opened so that the product P can be taken out of the decompression room 25.

A tray lift 28 that works as a part of the carrying mechanism is placed beneath the opening 25a in the decompression room 25. The tray T is placed on the top surface of the tray lift 28. The tray lift 28 is movable up and down between a first lift position where the top surface of the tray lift 28 reaches the same height as the opening 25a and a second lift position where the top surface of the tray lift 28 is located slightly lower than a position of arms of a lower tray support frame 320 (described later).

Figure 2:
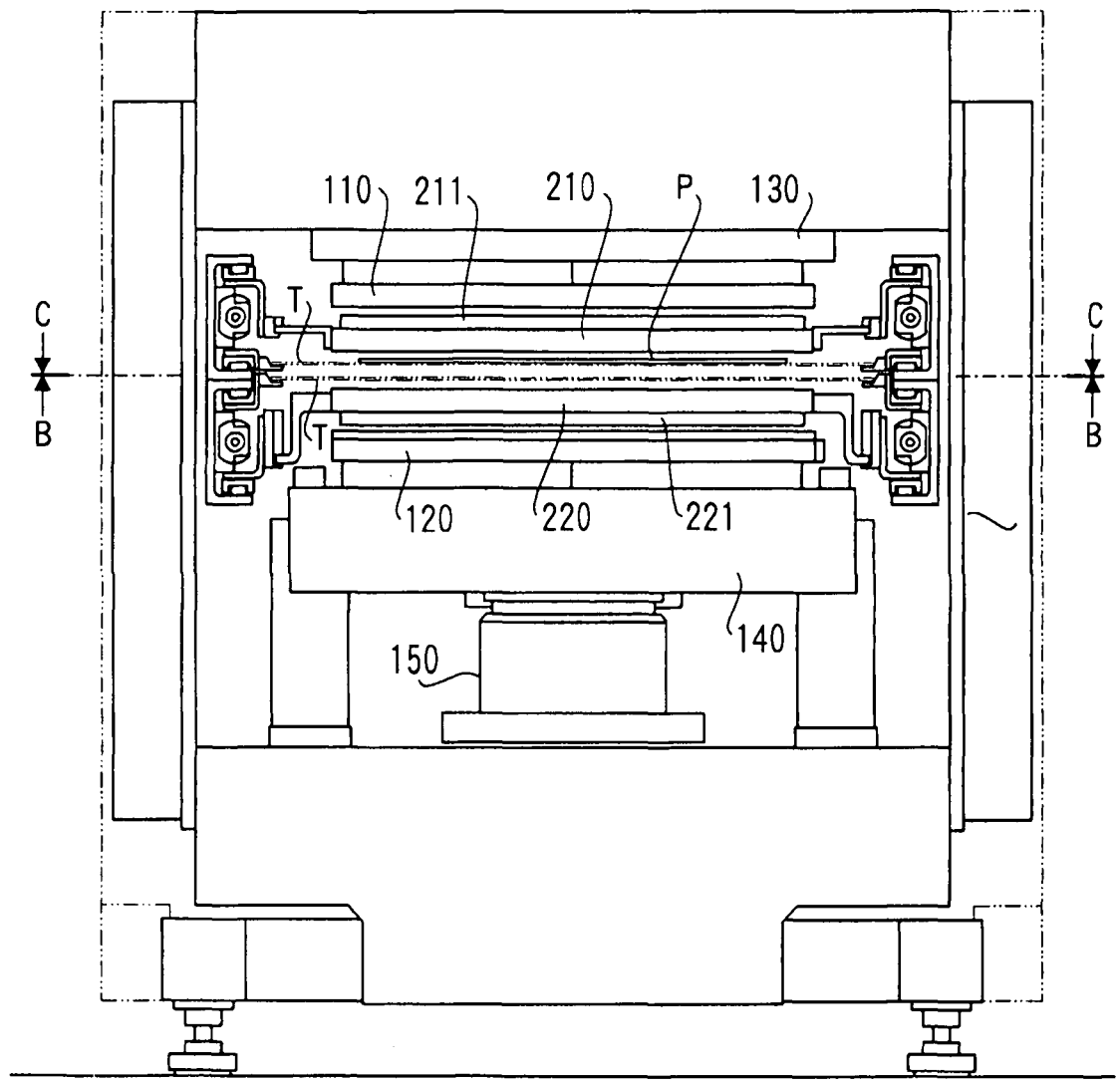
FIG. 2 is a cross-section taken along a line A-A in FIG. 1.

Subsequently, a configuration of the press body 100 will be described. FIG. 2 is a cross-section view of the press body 100 taken along a line A-A in FIG. 1.

The press body 100 is configured to perform the hot pressing of the product P between an upper heating plate 110 and a lower heating plate 120. The upper heating plate 110 is fixed on a bottom surface of a fixed platen 130 fixed on the upper side of the press body 100. The lower heating plate 120 is fixed on a top surface of a movable platen 140 fixed on a top surface of a press cylinder 150 placed at a lower side of the press body 100. The press cylinder 150 moves the movable platen 140 and the lower heating plate 120 up and down in a vertical direction to press the product with a desired pressure. It is noted that each surface temperature of the upper heating plate 110 and the lower heating plate 120 is kept at the molding temperature of the resin components of the product (e.g. if the product contains thermoplastic resin, the molding temperature is higher than a glass transition temperature of the thermoplastic resin).

Figure 3:
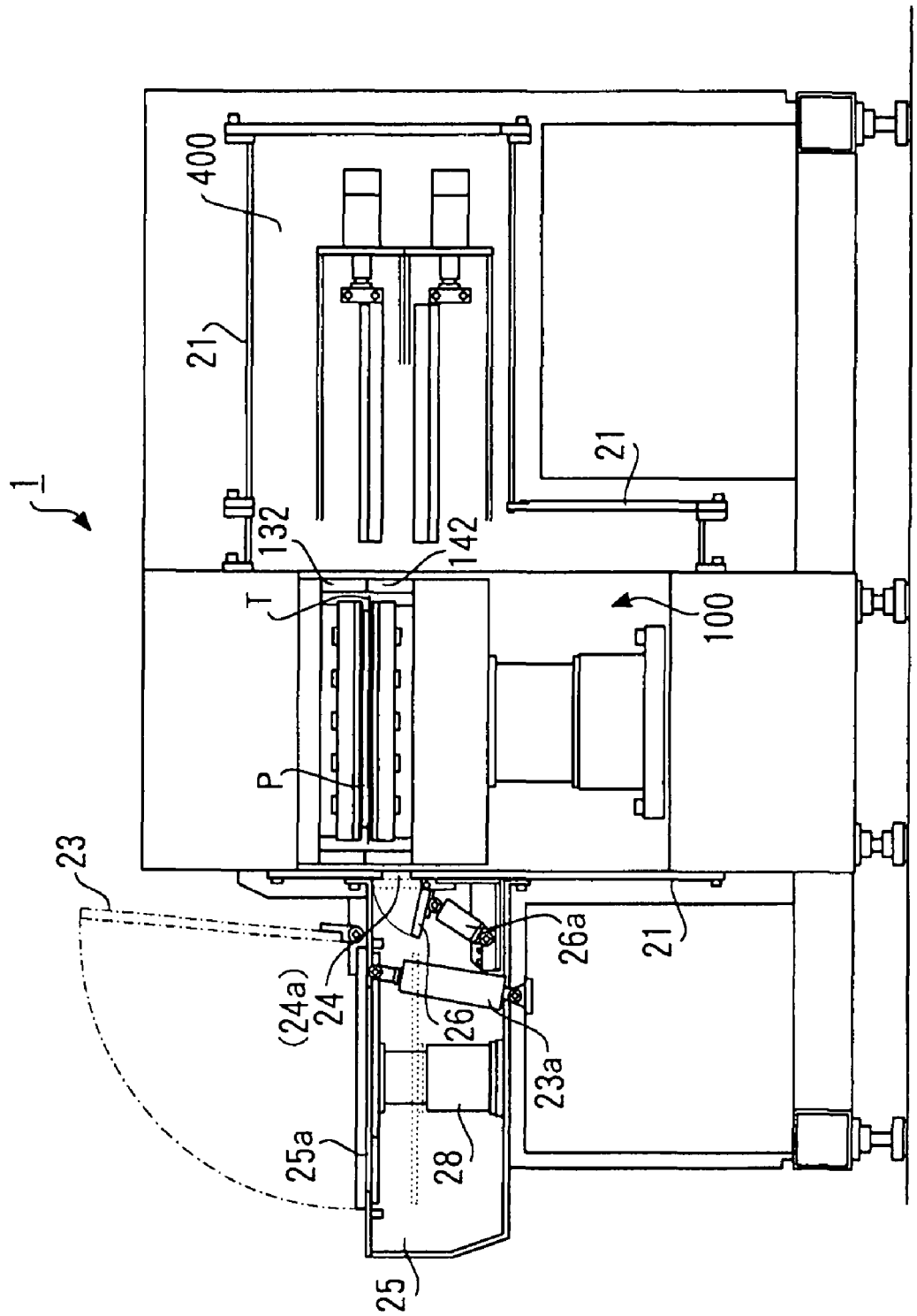
FIG. 3 is an elevational view of the press apparatus during hot pressing in the first embodiment according to the present invention.

FIG. 3 is an elevational view of the press apparatus in the first embodiment according to the present invention while the hot pressing is performed. As shown in FIGS. 1 and 3, a plurality of distance bars 132 and 142 are provided on the bottom surface of the fixed platen 130 and the top surface of the movable platen 140, respectively. Each of the distance bars 132 and 142 is a rod-shaped member and extends in a vertical direction. Specifically, the distance bars 132 extend downward in the vertical direction from the bottom surface of the fixed platen 130, and the distance bars 142 extend upward in the vertical direction from the top surface of the movable platen 140. The distance bars 132 and 142 are located in the same position in the horizontal direction such that the bottom surface of the distance bar 132 contacts with the top surface of the distance bar 142.

The distance bars 132 are configured to have the same length so that the bottom surfaces of the distance bars 132 are on the same horizontal plane. Similarly, the distance bars 142 are configured to have the same length so that the top surfaces of the distance bars 142 are on the same horizontal plane. Therefore, when the movable platen 140 is moved up, the bottom surfaces of all distance bars 132 simultaneously establish contact with the top surfaces of the corresponding distance bars 142. Then, when the distance bars 132 and 142 contact with each other, a distance between the upper heating plate 110 and lower heating plate 120 is maintained constant as shown in FIG. 3. Additionally, the distance bars 132 and 142 have such a high stiffness that the distance between the upper heating plate 110 and lower heating plate 120 hardly varies after the distance bars 132 and 142 contact with each other, even though an additional pressure is applied by the press cylinder 150. Therefore, it is possible to keep the product P as thick as a predetermined constant thickness therefor, whatever the product P is, by appropriately setting the length of each distance bar 132 and 142 in accordance with the predetermined thickness of the product P.

In addition, an upper cooling plate 210 and a lower cooling plate 220 are inserted into and taken off from a position between the upper heating plate 110 and the lower heating plate 120 by a cooling plate transfer mechanism (described later). Each temperature of the upper cooling plate 210 and the lower cooling plate 220 is kept at the room temperature by a temperature regulation mechanism described later. The products P, which contains thermoplastic resin, is hardened by pressing the product P between the upper and lower cooling plates driven by the press cylinder 150.

Additionally, as shown in FIG. 2, the upper and the lower cooling plates 210 and 220 are provided with heat insulators 211 and 221 on the upper surface of the cooling plate 210 and the bottom surface of the cooling plate 220, respectively. When the product P is pressed between the upper cooling plate 210 and the lower cooling plate 220, the upper cooling plate 210 and the lower cooling plate 220 establish contact with the upper heating plate 110 and the lower heating plate 120, respectively. However, the heat insulators 211 and 221 can prevent heat transfer from the heating plates to the cooling plates.

The tray T is translated between the second lift position of the tray lift 28 in the decompression room 25 and the press body 100 by a tray support frame driving mechanism (a part of the carrying mechanism). Hereinafter, the tray support frame driving mechanism will be described.

Please note that a direction in which the tray T is translated is referred to as a "carrying direction" in the following explanation. Additionally, in the press apparatus 1, the decompression room 25 side (i.e. the left side in FIG. 1) is referred to as "front" and the press body 100 side (i.e. the right side in FIG. 1) is referred to as "rear" in the carrying direction. Therefore, in the following explanation, the transfer of the tray T from the press body 100 to the decompression room 25 is referred to as "moving forward" and the otherwise (i.e. transfer of the tray T from the decompression room 25 to the press body 100) is referred to as "moving backward". Additionally, the horizontal direction perpendicular to the carrying direction (namely, the direction perpendicular to a sheet of FIG. 1) is defined as a "width direction." Further, in the width direction, a far side and a near side with respect of the sheet of FIG. 1 is referred to as a "far side" and a "near side", respectively. Incidentally, directions of the drawings are defined when the drawings are placed so that the reference numbers in the drawings can be read properly.

Figure 4:
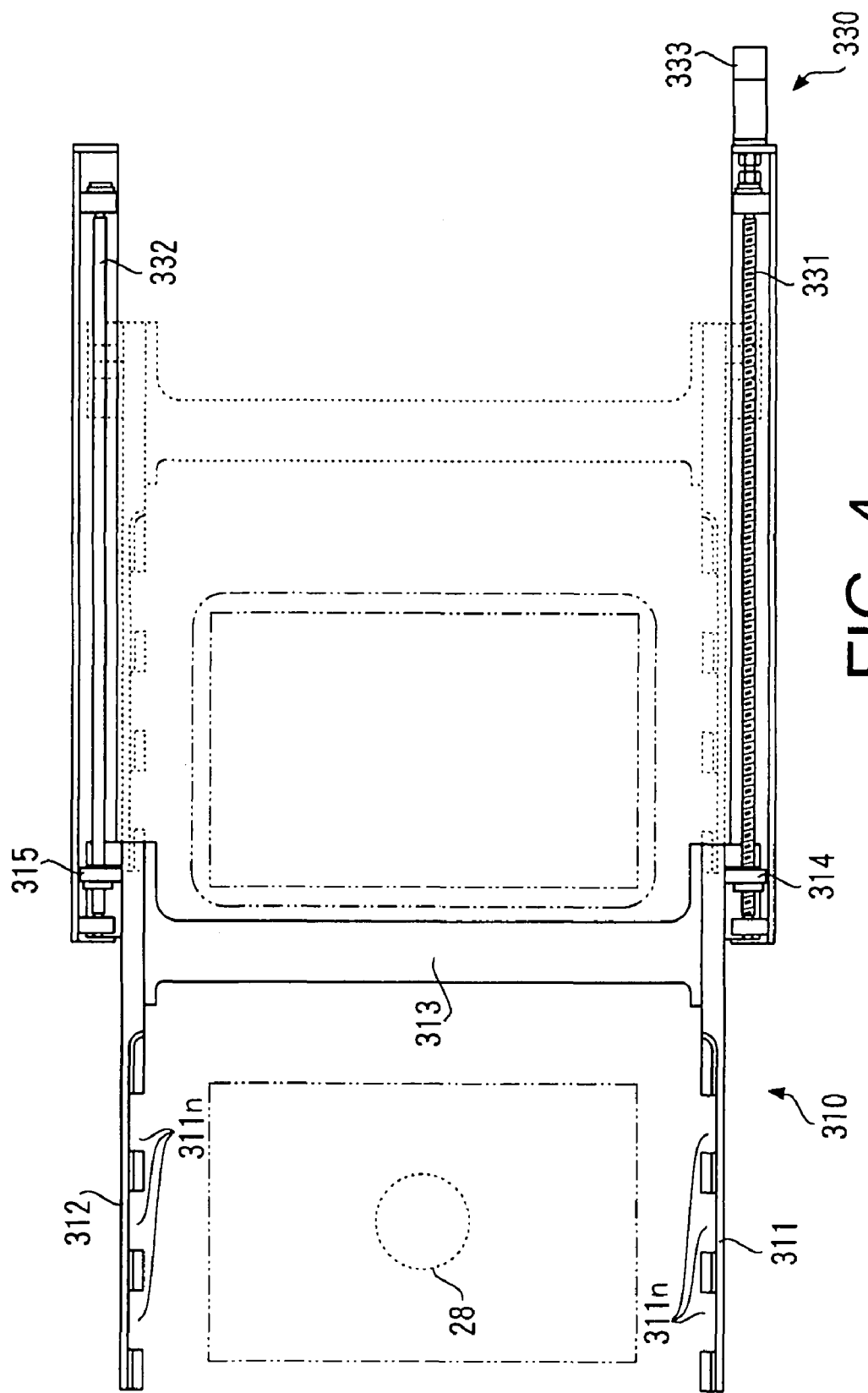
FIG. 4 is a cross-section taken along a line B-B in FIG. 2.
Figure 5:
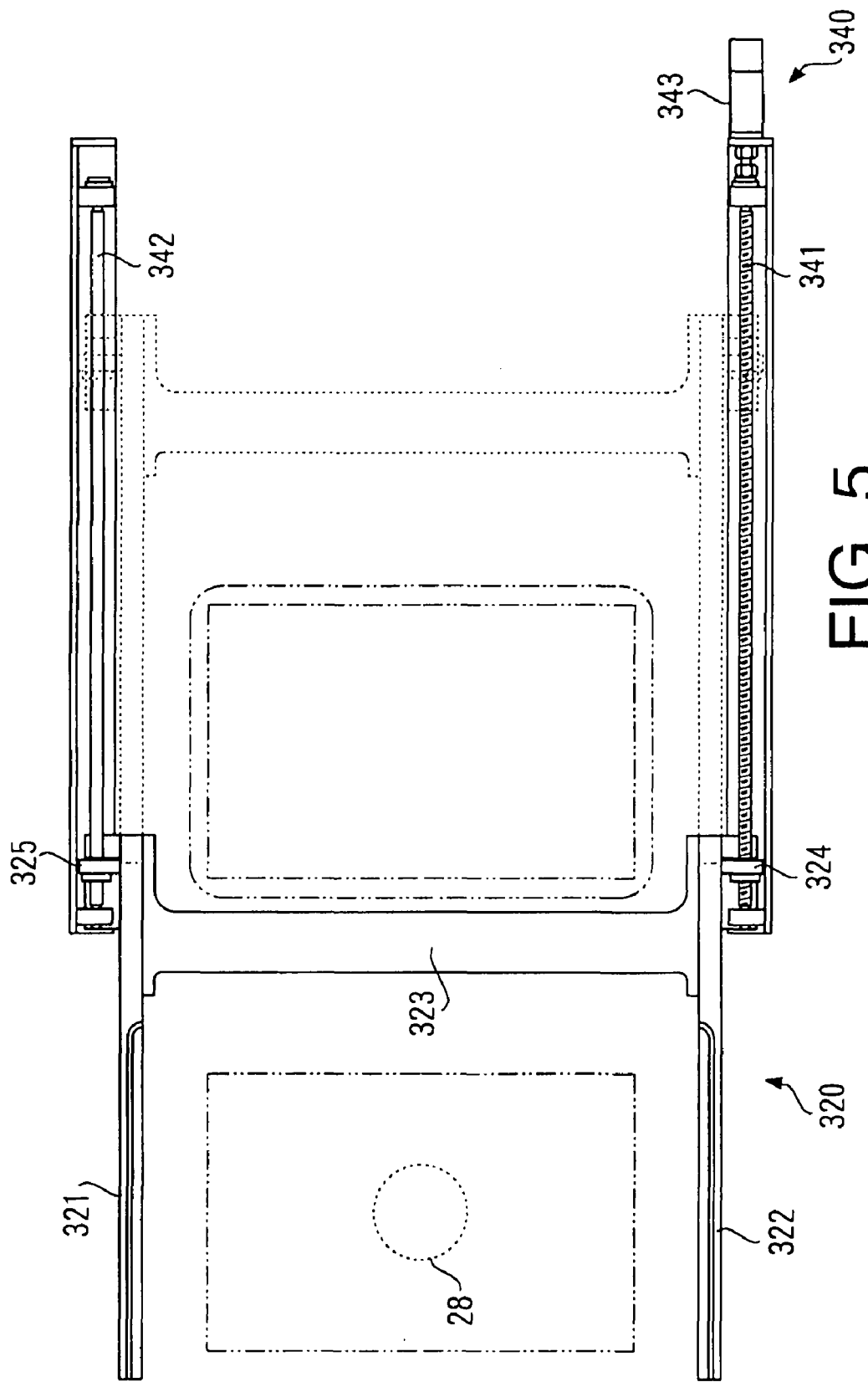
FIG. 5 is a cross-section taken along a line C-C in FIG. 2.

FIG. 4 is a cross-section taken along a line B-B in FIG. 2, and FIG. 5 is a cross-section taken along a line C-C in FIG. 2. As shown in FIGS. 4 and 5, the tray support frame driving mechanism in the present embodiment is provided with an upper tray support frame 310 on which the tray T is placed, a lower tray support frame 320 on which another tray T is placed, an upper tray support frame driving mechanism 330 which moves the upper tray support frame 310 in the horizontal direction and a lower tray support frame driving mechanism 340 which moves the lower tray support frame 320 in the horizontal direction. FIG. 4 shows the upper tray support frame 310 and the upper tray support frame driving mechanism 330. FIG. 5 shows the lower tray support frame 320 and the lower tray support frame driving mechanism 340.

As shown in FIG. 4, the upper tray support frame 310 is provided with a pair of arms 311 and 312 arranged in parallel at both sides in the width direction and extending along the forward direction, and a supporting member 313 extending along the width direction that connects a rear end of the arm 311 with a rear end of the arm 312.

The arm 311 has a nut 314 formed at the rear end thereof to project to the far side in the width direction. The nut 314 is engaged with a ball screw 331 of the upper tray support frame driving mechanism 330. The ball screw 331 is arranged at the far side of the press body 100 and extends along the carrying direction. The ball screw 331 is rotated about an axis thereof by driving a motor 333 provided at the rear end of the ball screw 331.

On the other hand, the arm 312 has a bearing 315 formed at the rear end thereof to project to the near side. The bearing 315 is slidably engaged with a guide shaft 332 of the upper tray support frame driving mechanism 330. The guide shaft 332 is arranged at the near side of the press body 100 and extends along the carrying direction.

Owing to the engagement between the guide shaft 332 and the bearing 315, the nut 314 does not slide when the ball screw 331 is rotated, thereby preventing the nut 314 from rotating together with the ball screw 331. Therefore, when the ball screw 331 is rotated, the nut 314 and the upper tray support frame 310 integrally formed therewith are moved in the carrying direction.

As shown in FIG. 5, the lower tray support frame 320 is provided with a pair of arms 321 and 322 arranged in parallel at both of the far and near ends thereof in the width direction and extending along the forward direction, and supporting member 323 extending along the width direction that connects a rear end of the arm 321 with a rear end of the arm 322.

The arm 322 has a nut 324 formed at a rear end thereof to project to the near side thereof. The nut 324 is engaged with a ball screw 341 of the lower tray support frame driving mechanism 340. The ball screw 341 is arranged in the near side of the press body 100 and extends along the carrying direction. The ball screw 341 is rotated about its axis by driving a motor 343 which is provided in the rear end of the ball screw 341.

On the other hand, the arm 321 has a bearing 325 formed at a rear end thereof to project to the far side thereof. The bearing 325 is slidably engaged with a guide shaft 342 of the lower tray support frame driving mechanism 340. The guide shaft 342 is arranged at the far side of the press body 100 and extends along the carrying direction.

Owing to the engagement between the guide shaft 342 and the bearing 325, the nut 324 does not slide when the ball screw 341 is rotated, thereby preventing the nut 324 from rotating together with the ball screw 341. Therefore, when the ball screw 341 is rotated, the nut 324 and the lower tray support frame 320 integrally formed therewith are moved in the carrying direction.

When the upper tray support frame 310 or the lower tray support frame 320 are moved forward, the arms thereof are projected into the decompression room 25 through the opening 24a in the partition 24 (see FIG. 1). It is noted that the distance between the arms 311 and 312 of the upper tray support frame 310 and the distance between the arms 321 and 322 of the lower tray support frame 320 are wider than the dimension of the tray lift 28 in the width direction. When the tray T is on the tray lift 28 and the tray lift 28 is located in the first lift position, the upper tray support frame 310 or the lower tray support frame 320 is moved forward. Then, the tray lift 28 is driven and moved to the second lift position so that the tray T on the tray lift 28 is transferred onto the arms of the upper tray support frame 310 or the lower tray support frame 320. Meanwhile, in order to transfer the tray T onto the arms of the upper tray support frame 310 or the lower tray support frame 320 to the tray lift 28, the upper tray support frame 310 or the lower tray support frame 320 are moved forward in a state where the tray lift 28 is located in the second lift position, then lifting the tray lift 28 up to the first lift position.

Additionally, in the present embodiment, the tray T and product P thereon are pressed by moving up the movable platen 140 placed underneath the press body 100. Hence the product P and the tray T are lifted apart from the arms while they are pressed.

Figure 6:
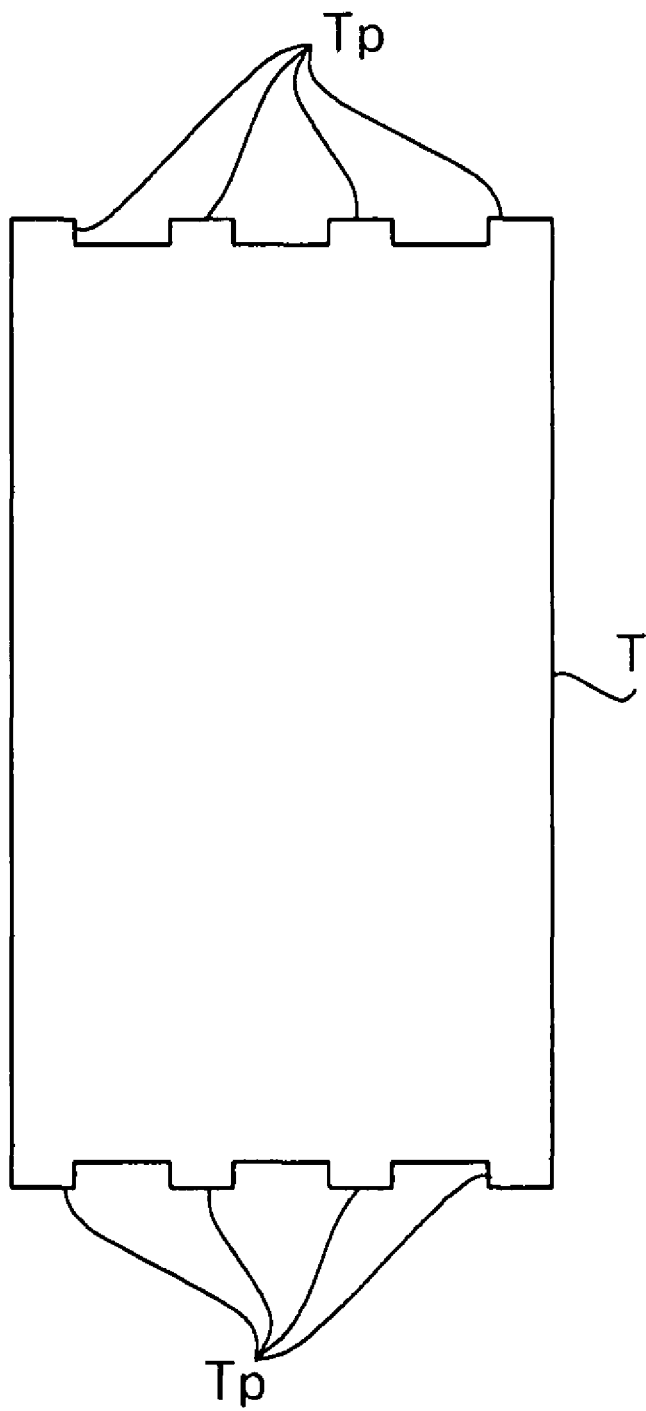
FIG. 6 is a top view of a tray in the first embodiment according to the present invention.

FIG. 6 is a top view of the tray T in the present embodiment. As shown in FIG. 6, a plurality of projections Tp projecting in the width direction are formed on both end surfaces of the tray T in the width direction. When the tray T is supported by the upper tray support frame 310 or the lower tray support frame 320, only the projections Tp are in contact with the upper tray support frame 310 or the lower tray support frame 320. Additionally, a plurality of cutout portions 311n and 312n corresponding to the projections Tp are formed on the arms 311 and 312 of the upper tray support frame 310 as shown in FIG. 4, respectively. When the tray T and product P thereon the tray T are pressed in a state supported by the lower tray support frame 320, the upper tray support frame 310 is moved backward so that the positions of the projections Tp correspond to those of the cutout portions 311n and 312n in the carrying direction. Therefore, the tray T does not contact with the arms 311 and 312 of the upper tray support frame 310 when the product P on the tray T is pressed. Additionally, the tray T and product P thereon that are supported by the upper tray support frame 310 can be transferred to the lower tray support frame 320 by moving up the movable platen 140 so that the tray T and product P thereon can be lifted, then by moving the upper tray support frame 310 backward so that the positions the projections Tp can correspond to those of the cutout portions 311n and 312n in the carrying direction, and further by moving down the movable platen 140 so that the tray T and product P thereon can be located on the arms of the lower tray support frame 320.

Figure 7:
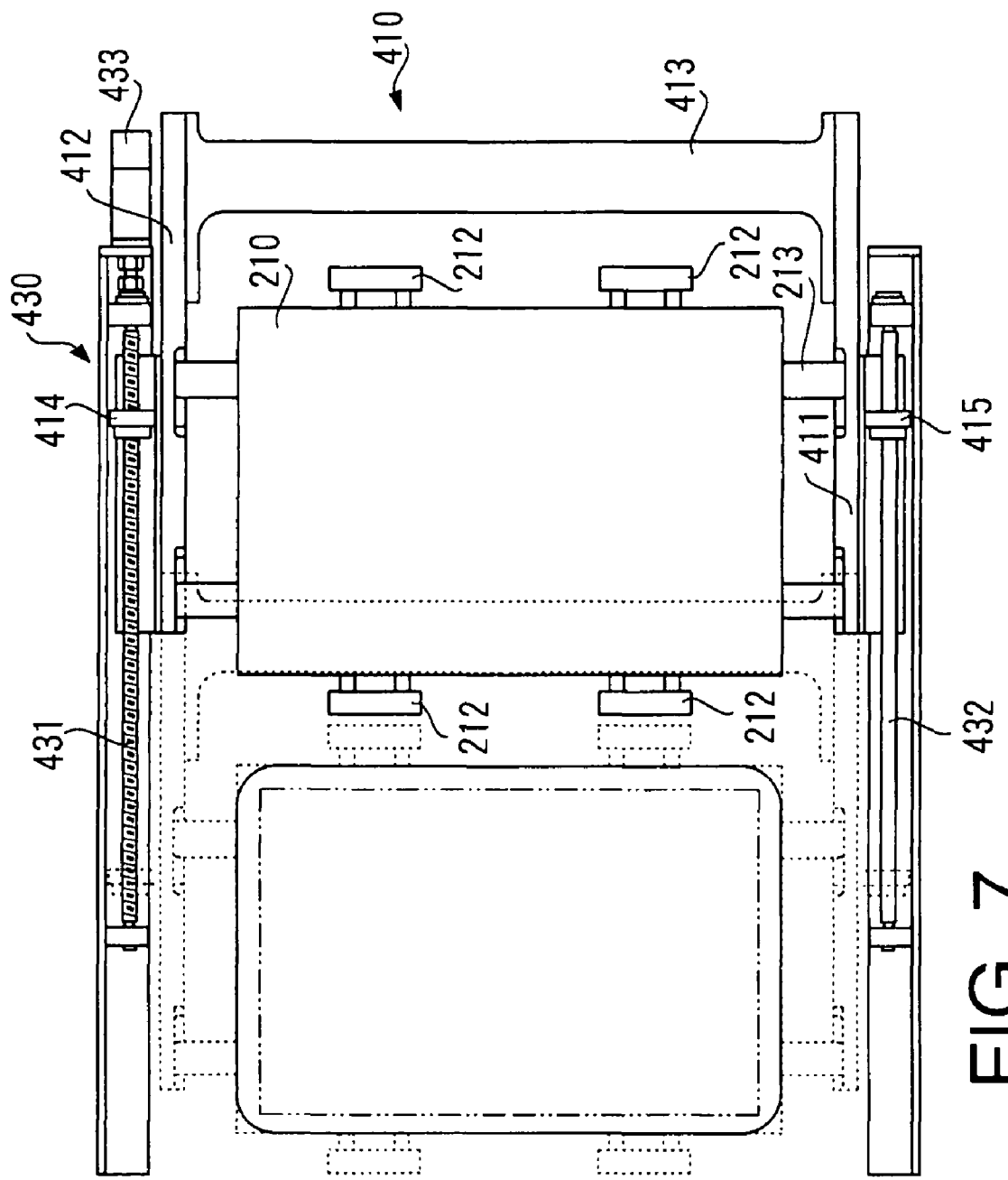
FIG. 7 is a cross-section taken along a line D-D in FIG. 1.
Figure 8:
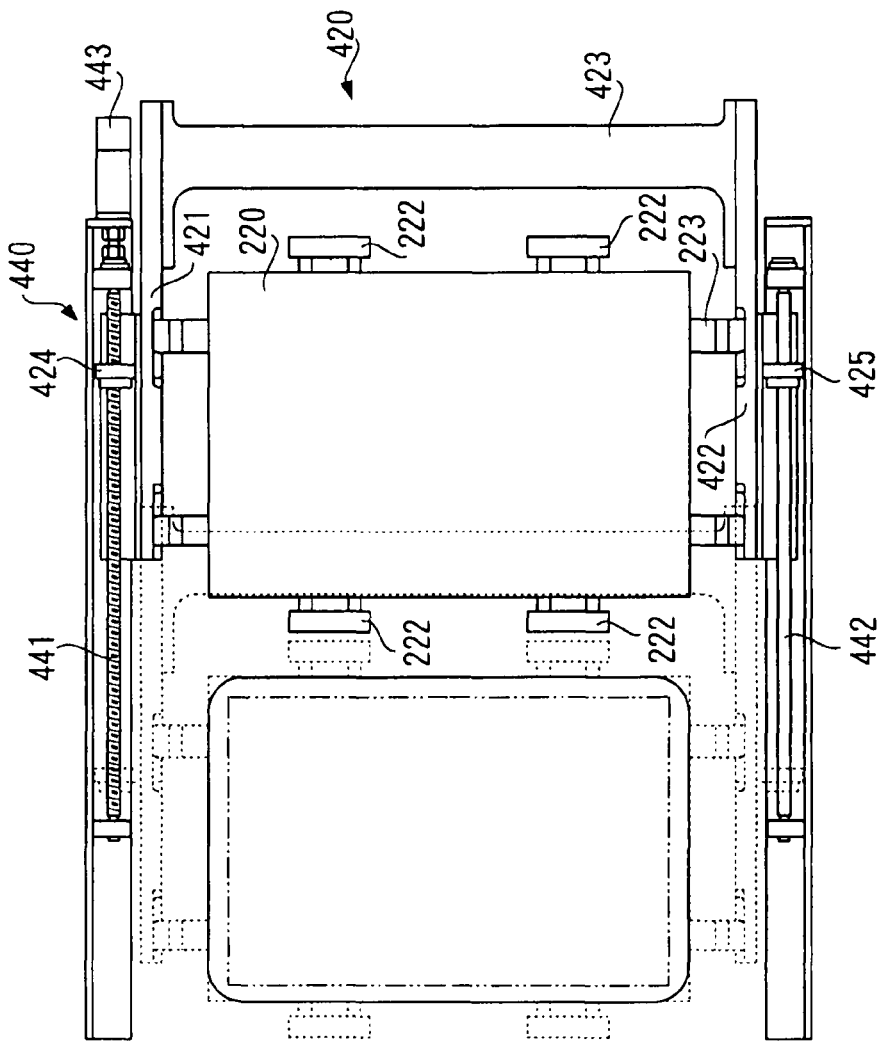
FIG. 8 is a cross-section taken along a line E-E in FIG. 1.
Figure 9:
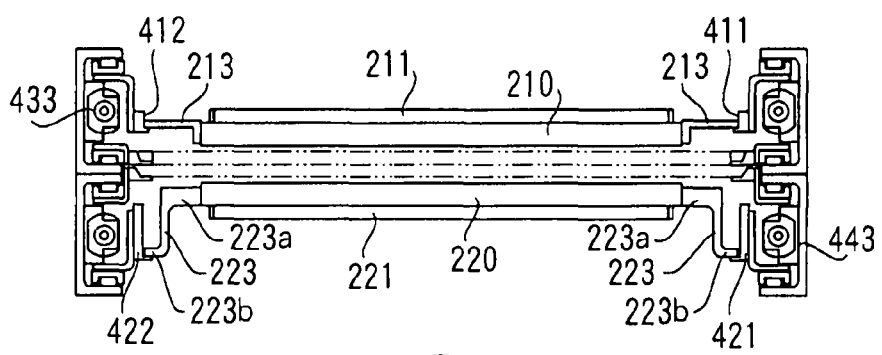
FIG. 9 is a side view of an upper cooling plate and a lower cooling plate in the first embodiment according to the present invention.

Hereinafter, the cooling plate transfer mechanism to transfer the upper cooling plate 210 and lower cooling plate 220 will be described. As shown in FIG. 3, when the hot pressing is implemented, the upper cooling plate 210 and the lower cooling plate 220 are saved in a cooling plate retreat section 400 located adjacent to the rear side of the press body 100. FIGS. 7 and 8 are cross-sections taken along lines D-D and E-E in FIG. 1, respectively. FIG. 9 is a side view of the cooling plate transfer mechanism shown in FIGS. 7 and 8. As shown in FIGS. 7 and 8, the cooling plate transfer mechanism in the present embodiment is provided with an upper cooling plate support frame 410 on which the upper cooling plate 210 is placed, a lower cooling plate support frame 420 on which the lower cooling plate 220 is placed, an upper cooling plate support frame driving mechanism 430 to move the upper cooling plate support frame 410 in the horizontal direction, and a lower cooling plate support frame driving mechanism 440 to move the lower cooling plate support frame 420 in the horizontal direction.

As shown in FIG. 7, the upper cooling plate support frame 410 is provided with a pair of arms 411 and 412 that are arranged in parallel at the both sides in the width direction and extend to the forward direction, and a supporting member 413 extending to the width direction that connects the rear end of the arm 411 with the rear end of the arm 412.

The arm 412 has a nut 414 projecting to the near side on its middle part. The nut 414 is engaged with a ball screw 431 of the upper cooling plate support frame driving mechanism 430. The ball screw 431 is arranged at the near side of the press body 100 and extends along the carrying direction. The ball screw 431 is rotated about its axis by driving a motor 433 provided at the rear end of the ball screw 431.

On the other hand, the arm 411 has a bearing 415 projecting to the far side at its rear end. The bearing 415 is slidably engaged with a guide shaft 432 of the upper cooling plate support frame driving mechanism 430. The guide shaft 432 is arranged at the far side of the press body 100 and extends along the carrying direction.

Owing to the engagement between the guide shaft 432 and the bearing 415, the nut 414 does not slide when the ball screw 431 is rotated, thereby preventing the nut 414 from rotating together with the ball screw 431. Therefore, when the ball screw 431 is rotated, the nut 414 and the upper cooling plate support frame 410 integrally configured therewith are moved back and forth along the carrying direction.

As shown in FIG. 8, the lower cooling plate support frame 420 is provided with a pair of arms 421 and 422 that are arranged in parallel at the both sides in the width direction and extend to the forward direction, and a supporting member 423 extending to the width direction that connects the backward of the arm 421 with the backward of the arm 422.

The arm 421 has a nut 424 projecting to the far side on its middle part. The nut 424 is engaged with a ball screw 441 of the lower cooling plate support frame driving mechanism 440. The ball screw 441 is arranged at the near side of the press body 100 and extends along the carrying direction. The ball screw 441 is rotated about its axis by driving a motor 443 provided at the rear end of the ball screw 441.

On the other hand, the arm 422 has a bearing 425 projecting to the near side in its rear end. The bearing 425 is slidably engaged with a guide shaft 442 of the lower cooling plate support frame driving mechanism 440. The guide shaft 442 is arranged at the near side of the press body 100 and extends along the carrying direction.

Owing to the engagement between the guide shaft 442 and the bearing 425, the nut 424 does not slide when the ball screw 441 is rotated, thereby preventing the nut 424 from rotating together with the ball screw 441. Therefore, when the ball screw 441 is rotated, the integrated nut 424 and the lower cooling plate support frame 320 are moved back and forth along the carrying direction.

With the above configuration, when the upper cooling plate support frame 410 and the lower cooling plate support frame 420 are moved forward, the arms of the frames are projected into a space between the upper heating plate 110 and the lower heating plate 120 of the press apparatus as indicated by a broken line in FIGS. 7 and 8. Then, when the upper cooling plate support frame 410 and the lower cooling plate support frame 420 are moved backward, the arms of the frames are placed in the cooling plate retreat section 400 as indicated by a solid line in FIGS. 7 and 8.

Additionally, the upper cooling plate 210 and the lower cooling plate 220 have a plurality of distance bars 212 and 222 as shown in FIGS. 7 and 8, respectively. The distance bars 212 are configured to have the same length so that the bottom surfaces of the distance bars 212 are on the same horizontal plane. Similarly, the distance bars 222 are configured to have the same length so that the top surfaces of the distance bars 212 are on the same horizontal plane. The positions of the distance bars 212 and 222 in the horizontal direction are configured so that the bottom surfaces of the distance bars 212 contact with the top surfaces of the distance bars 222. Additionally, the distance bars 212 and 222 have such a high stiffness that the distance between the upper cooling plate 210 and the lower cooling plate 220 hardly varies after the distance bars 212 and 222 contacts each other, even if an additional pressure is applied by the press cylinder 150. Therefore, it is possible to keep the product P after pressing as thick as a predetermined constant thickness therefor, whatever the product is, by appropriately setting the length of each distance bar 212 and 222 in accordance with the predetermined thickness of the product P.

As described above, when the tray T and the product P is pressed by moving the movable platen 140 upward in the present invention, the upper cooling plate 210 and the lower cooling plate 220 are lifted apart from the arms. FIG. 9 is a side view of the upper cooling plate 210 and the lower cooling plate 220. As shown in FIG. 9, the upper cooling plate 210 is supported by the arms 411 and 412 of the upper cooling plate support frame 410 via an arm portion 213 extending along the width direction from the upper cooling plate 210. The lower cooling plate 220 is supported by the arms 421 and 422 of the lower cooling plate support frame 420 via an arm portion 223 extending in a crank shape along the width direction from the lower cooling plate 220.

In addition, the arm portion 223 is formed so that the upper corner 223a is placed between the arms 411 and 412 of the upper cooling plate support frame 410 in the width direction. Further, the lower end 223b, which contacts with the arms 411 and 412, is placed sufficiently lower than the arms 411 and 412 of the upper cooling plate support frame 410. Therefore, even though the position of the top surface of the lower cooling plate 220 becomes higher than the arms 411 and 412 when the upper cooling plate 210 and the lower cooling plate 220 is lifted apart from the arms 411, 412, 421 and 422 during the pressing, the arm portion 223 of the lower cooling plate 220 does not contact with the arms 411 and 412 of the upper cooling plate support frame 410.

Figure 10:
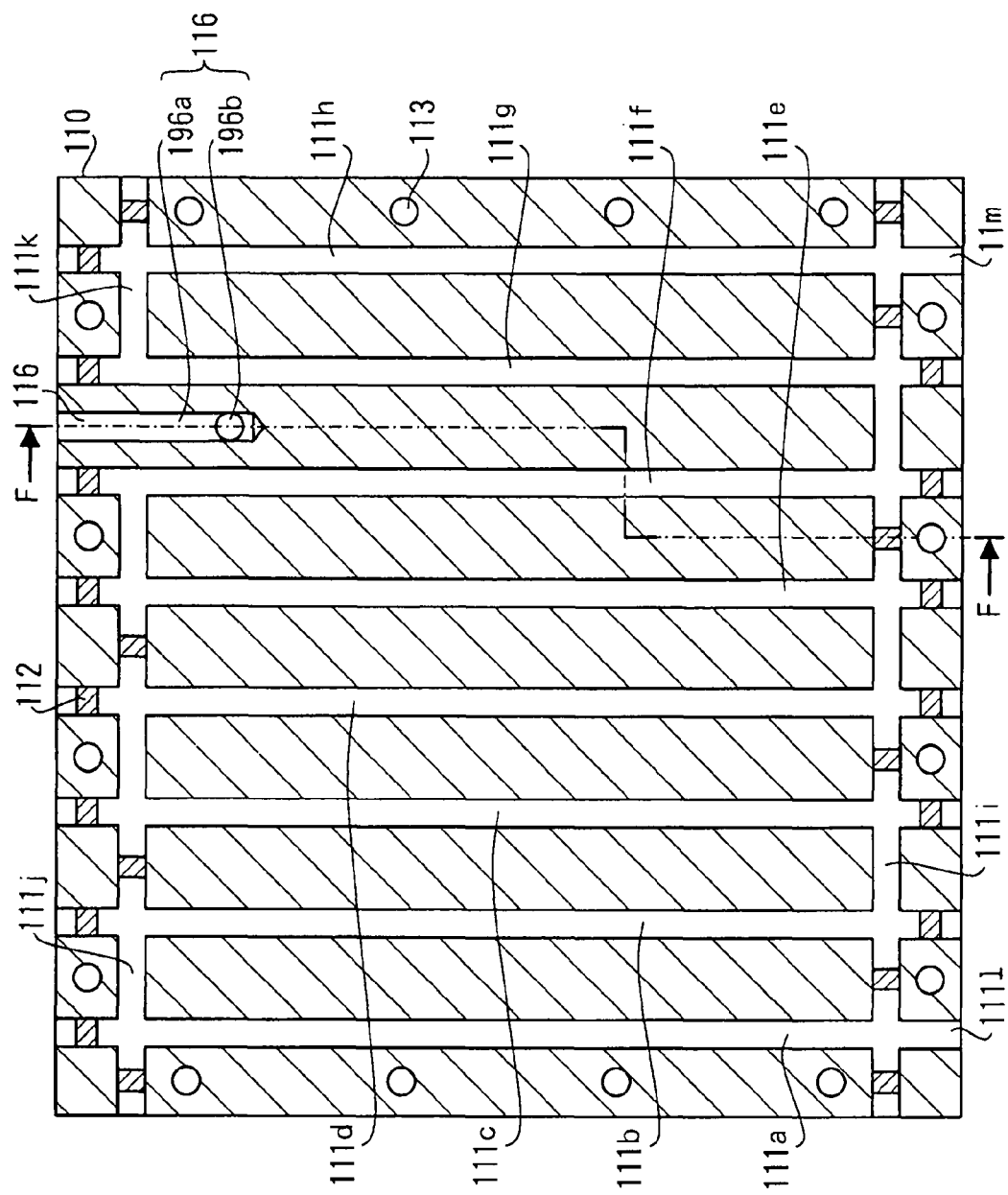
FIG. 10 is a cross-section view of an upper heating plate along a horizontal plane in the first embodiment according to the present invention.

Hereinafter, the temperature regulation mechanisms of the upper heating plate 110, the lower heating plate 120, the upper cooling plate 210 and the lower cooling plate 220 will be described. FIG. 10 is a cross section view of the upper heating plate 110 along a horizontal plane. Please note that the temperature regulation mechanisms of the lower heating plate 120, the upper cooling plate 210 and the lower cooling plate 220 are the same as that of the upper heating plate 110. Therefore, the explanation thereof will be omitted.

The upper heating plate 110 is a substantially rectangular steel plate. The upper heating plate 110 has eight first holes 111a through 111h (referred to in an order from a left side in FIG. 10) that are formed as through holes parallel to each other in the width direction (i.e. in an up-and-down direction in FIG. 10), a second hole 111i formed in the carrying direction to orthogonally intersect with all of the first holes 111a through 111h at a lower side of the upper heating plate 110 in FIG. 10, a third hole 111j formed in the carrying direction to orthogonally intersect with the first holes 111a through 111f at an upper left side of the upper heating plate 110 in FIG. 10, and a fourth hole 111k formed in the carrying direction to orthogonally intersect with the first holes 111g and 111h at an upper right side of the upper heating plate 110 in FIG. 10. Both ends of each of the first holes 111b through 111g are sealed by blank caps 112. An upper end of each of the first holes 111a and 111h in FIG. 10 is sealed by a blank cap 112. Further, blank caps 112 are fitted into portions at both sides, between the first hole 111a and 111b, between 111c and 111d, between 111e and 111f, and between 111g and 111h in the second hole 111i. Additionally, blank caps 112 are fitted into portions at a left end, between the first hole 111b and 111c, and between 111d and 111e in the third hole 111j. Furthermore, blank caps 112 is fitted into a portion at a right end in the fourth hole 111k. Therefore, the first holes 111a through 111h, the second hole 111i, the third hole 111j and the fourth hole 111k form a heat medium pipeline running all over through the upper heating plate 110 with a lower end 111l of the first hole 111a and a lower end 111m of the first hole 111h as both ends thereof.

In the heat medium pipeline, heat medium oil heated by a heater is circulated by a pump. Thereby, the upper heating plate 110 is heated. Additionally, a temperature sensor connected to a controller of the press apparatus 1 is mounted on the upper heating plate 110 (not shown). When the product P is pressed by the press apparatus 1, the controller controls the heater to regulate the temperature of the heat medium oil running through the heat medium pipeline so that the temperature on the upper heating plate 110 measured by the temperature sensor is a molding temperature of the product P.

Additionally, the upper heating plate 110 has a fifth hole 116a formed between the first hole 111f and the 111g. The hole 116a is formed parallel to the first hole 111f from a top end of the upper heating plate 110 in FIG. 10. The fifth hole 116a crosses a sixth hole 116b formed from a bottom surface of the upper heating plate 110 in the vertical direction. The fifth hole 116a and the sixth hole 116b form a heat medium path for pressurizing, which runs from a side surface of the upper heating plate 110 (i.e. top end in FIG. 10) to the bottom surface of the upper heating plate 110.

Figure 11:
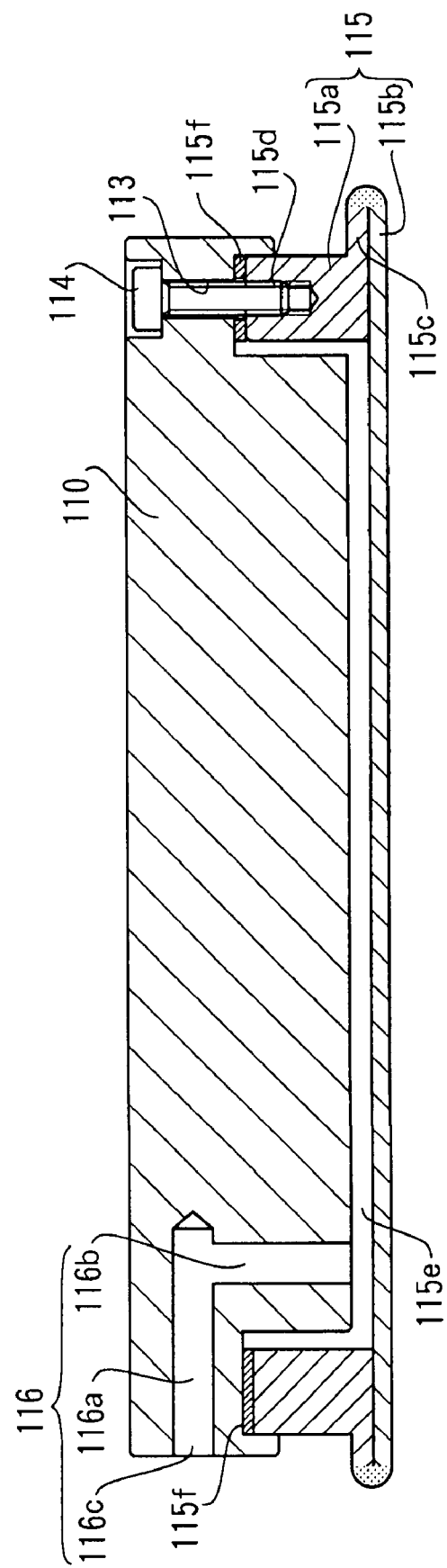
FIG. 11 is a cross-section taken along a line F-F in FIG. 10.

FIG. 11 is a cross section view of the upper heating plate 110 taken along a line F-F in FIG. 10. As shown in FIG. 11, the upper heating plate 110 is a thick plate member with a marginal portion of the bottom surface thereof being cut out. Additionally, the bottom surface of the upper heating plate 110 is covered with a heating plate cover 115. The heating plate cover 115 is provided with a rectangular frame 115a covering the cutout portion of the upper heating plate 110 and a metal plate 115b made of stainless steel. A lower end of the frame 115a is formed as a flange 115c projecting outside. The frame 115a and the metal plate 115b are integrated to form the heating plate cover 115 in a box shape by welding the flange 115c and an edge of the meal plate 115b with no space between them.

Additionally, a plurality of holes 113 are formed to penetrate the marginal portion of the upper heating plate 110 in the vertical direction. The heating plate cover 115 is fixed to the upper heating plate 110 by screwing the bolts 114 into the heating plate cover 115 through the holes 113. Specifically, the frame 115a of the heating plate cover has a plurality of threaded holes 115d, and therefore, the bolts 114 are screwed into the threaded holes 115d through the holes 113 so that the upper heating plate 110 is fixed to the heating plate cover 115.

A space 115e is formed between the bottom surface of the upper heating plate 110 and the metal plate 115b. Then, the space 115e and the heat medium path 116 are filled with the heat medium oil. The heat medium oil filling the space 115e and the heat medium path 116 transfers heat of the upper heating plate 110 to the metal plate 115b. Since the heat medium filling the space 115e has high fluidity, the heat of the upper heating plate 110 is transferred to the metal plate 115b quickly. Additionally, the heat medium path 116 has an opening 116c communicating with a pressure generator. The pressure generator is connected to a controller of the press apparatus 1, and the controller controls the pressure generator to change the pressure of the heat medium oil filling the space 115e and the heat medium path 116. Further, a packing 115f is inserted between the top surface of the frame 115a and the cutout portion of the upper heating plate 110 so as to prevent the leakage of the heat medium oil from a gap between the frame 115a and the upper heating plate 110.

The bottom surface of the metal plate 115b is mirror-finished with a surface roughness within several micrometers. Therefore, when the pressure for pressing the product P and the pressure of the heat medium oil in the heat medium path 116 are in proportion and the metal plate 115b is kept flat, the flatness of the bottom surface of the metal plate 115b is kept within 10 micrometers.

It is noted that the lower heating plate 120 is also fixed to a heating plate cover configured as above described, and it is heated and pressed by the heat medium oil in the same manner as the upper heating plate 110. The pressure of the heat medium oil in the upper heating plate 110 and that in the lower heating plate 120 are in proportion. Therefore, the metal plates of the upper heating plate 110 and the lower heating plate 120 are kept in a high level of flatness and the upper heating plate 110 and the lower heating plate 120 are followed by each other.

Both the upper heating plate 110 and the lower heating plate 120 in the press apparatus 1 are provided with their respective heating plate covers in the present embodiment. However, the present invention is not limited to the above embodiment. For example, the heating plate cover may be provided to one of the upper heating plate 110 and the lower heating plate 120. In such a case, the metal plate of the heating plate cover is pressed to follow the heating plate without the heating plate cover, and the metal plate is kept in a high level of flatness.

The upper cooling plate 210 and the lower cooling plate 220 have the same structure as above, in which temperature of a metal plate of a cooling plate cover of each of the cooling plates is controlled by the heat medium oil. The metal plates pressed by the heat medium oil are kept in a high level of flatness by following each other. Incidentally, the temperature of the heating media oil is kept at the room temperature by a cooling device instead of the heater.

Hereinafter, a procedure for pressing the product P by the press apparatus 1 configured as above will be described. Please note that the tray T is placed on the arms 321 and 322 of the lower tray support frame 320 in an initial state.

Firstly, the upper heating plate 110 and the lower heating plate 120 are heated up to the molding temperature of the product P by heating the heat medium oil running through the heat medium pipelines formed inside the upper heating plate 110 and the lower heating plate 120 by the heater. The heat of the upper heating plate 110 is transferred to the heating plate cover 115 through the heat medium oil filling a space between the upper heating plate 110 and the heating plate cover 115. Then the heating plate cover 115 is heated immediately. Further, the heat of the lower heating plate 120 is transferred to the heating plate cover thereof through the heat medium oil filling a space between the lower heating plate 120 and the heating plate cover thereof. Then the heating plate cover of the lower heating plate 120 is heated immediately. Meanwhile, the temperatures of the upper cooling plate 210 and the lower cooling plate 220 are kept at the room temperature by cooling the heat medium oil running through the heat medium pipelines formed in the upper cooling plate 210 and the lower cooling plate 220 by the cooling device, respectively.

Each temperature of the upper heating plate 110, the lower heating plate 120, the upper cooling plate 210 and the lower cooling plate 220 is measured by the temperature sensor mounted on each of the heating plates and cooling plates. The pressing of the product P is started when the temperature measured by the temperature sensor for each of the heating plates becomes the molding temperature of the product P, and when the temperature measured by the temperature sensor for each of the cooling plates becomes the room temperature.

Initially, after confirming the inner door 26 being closed, the outer door 23 is opened. Then the tray lift 28 is moved upward to the first lift position, and the product P is placed on the top surface of the tray T.

Next, the outer door 23 is closed and the decompression room 25 is substantially depressurized to the vacuum state.

Then, the inner door 26 is opened, and the upper tray support frame 310 is moved forward so that the arms 311 and 312 are projected from the opening 24a of the partition 24. Then, the tray lift 28 is moved down to the second lift position. Therefore, the tray T is placed on the arms 311 and 312.

Next, the upper tray support frame 310 is moved backward so that the arms 311 and 312 are placed between the heating plates 110 and 120 of the press body 100. At the same time, the lower tray support frame 320 is moved forward so that the arms 321 and 322 are projected from the opening 24a. Then, the tray lift 28 is moved up to the first lift position. Consequently, the tray T placed on the arms 321 and 322 is transferred to the top surface of the tray lift 28.

Next, the lower tray support frame 320 is moved backward so that the arms 321 and 322 are placed between the heating plates 110 and 120 of the press body 100. Then the inner door 26 is closed.

Thereafter, the movable platen 140 is moved up so that the bottom surfaces of the distance bars 132 on the fixed platen 130 contact with the top surfaces of the distance bars 142 on the movable platen 140. At this time, the distance between the upper and the lower heating plates is kept constant (e.g. 0.5 mm to 1 mm).

In this situation, the product P is pressed under a predetermined press pressure by driving the press cylinder 150. Simultaneously, the heat medium oil filling the space between the upper heating plate 110 and the heating plate cover 115 and the heat medium oil filling the space between the lower heating plate 120 and the heating plate cover thereof are pressed under a predetermined pressure by driving the pressure generator.

The pressure of the heat medium oil filling the space between the upper heating plate 110 and the heating plate cover 115 and the pressure of the heat medium oil filling the space between the lower heating plate 120 and the heating plate cover thereof are suppressed to be as high as to or less than the predetermined press pressure so as to prevent opening that might be formed between the upper and lower heating plates 110 and 120 due to the pressure of the heat medium oil.

The product P is continuously pressed under the aforementioned conditions for a predetermined period which is long enough for hot pressing. Thereafter, the controller of the press apparatus 1 controls the pressure generator to reduce the oil pressure of the heat medium oil filling the space between the upper heating plate 110 and the heating plate cover 115 and the space between the lower heating plate 120 and the heating plate cover thereof. Simultaneously, the controller controls the press cylinder 150 to reduce the pressure to the product P. Then the movable platen 140 is moved down to separate the upper heating plate 110 and the lower heating plate 120. With the above procedure, the hot pressing of the product P is completed. At this time, the tray T with the product P thereon is placed on the arms 311 and the 312 of the upper tray support frame 310 again.

During the hot pressing, the barometrical pressure of the decompression room 25 is controlled back to the atmosphere pressure by releasing a valve (not shown) of the decompression room 25. Then, the previously molded product P is taken off and another product P to be next pressed is placed on the tray T on the top surface of the tray lift 28. During this procedure, since the inner door 26 is closed, the first section is substantially kept in the vacuum state.

Subsequently, the cold pressing is executed. The upper cooling plate support frame 410 and the lower cooling plate support frame 420 are moved forward so that the upper cooling plate 210 and the lower cooling plate 220 are placed on and under the hot pressed product P, respectively.

Next, the movable platen 140 is moved up so that the bottom surface of the distance bar 212 of the upper cooling plate 210 contacts with the top surface of the distance bar 222 of the lower cooling plate 220. At this time, the distance between the upper and the lower cooling plates are kept constant (e.g. 0.5 mm to 1 mm).

In the above state, the product P is pressed under the predetermined pressure by driving the press cylinder 150. Simultaneously, the heat medium oil filling the space between the upper cooling plate 210 and a cooling plate cover thereof and the space between the lower cooling plate 220 and the cooling plate cover thereof are pressed under the predetermined pressure by driving the pressure generator.

The pressure of the heat medium oil filling the space between the upper heating plate 210 and a cooling plate cover thereof and the space between the lower cooling plate 220 and the cooling plate cover thereof is suppressed to be as high as or less than the predetermined pressure by the press cylinder 150 to prevent opening that might be formed between the upper and the lower cooling plates 210 and 220 due to the pressure of the heat medium oil.

In such a state, the product P is continuously pressed for a predetermined period which is long enough for cooling the product P. Then, the controller of the press apparatus 1 controls the pressure generator to reduce the oil pressure of the heat medium oil filling the space between the upper cooling plate 210 and the cooling plate cover 115 and the space between the lower cooling plate 120 and the cooling plate cover thereof. Then, the controller controls the press cylinder 150 to reduce the pressure to the product P. Simultaneously, the upper tray support frame 310 is moved backward so that the positions of the projections Tp of the tray T corresponds to those of the cutout portion 311n and 312n of the arm 311 and 312, respectively in the carrying direction. Then, the movable platen 140 is moved down to separate the upper cooling plate 210 and the lower cooling plate 220. Then, the upper cooling plate support frame 410 and the lower cooling plate support frame 420 are moved backward so that the upper cooling plate 210 and the lower cooling plate 220 are placed in the cooling plate retreat section 400. With the above procedure, the cold pressing of the product P is completed. At this time, the tray T with the product P thereon is placed on the arms 321 and 322 of the lower tray support frame 320 through the arms 311 and 312 of the upper tray support frame 310.

Then, the outer door 23 is closed, and the decompression room 25 is substantially depressurized to the vacuum state by the pump. At this time, the tray T with a product P before the pressing placed thereon is placed on the top surface of the tray lift 28.

Next, the inner door 26 is opened, and the upper tray support frame 310 is moved forward so that the arms 311 and 312 are projected from the opening 24a of the partition 24. Then, the tray lift 28 is moved downward so that the tray T with the product P before the pressing thereon is placed on the arms 311 and 312.

Next, the upper tray support frame 310 is moved forward so that the arms 311 and 312 are placed between the heating plates 110 and 120. At the same time, the lower tray support frame 320 is moved forward so that the arms 321 and 322 are projected from the opening 24a. Then, the tray lift 28 is moved up to the first lift position. Therefore, the pressed product P and the tray T that are placed on the arms 321 and 322 are transferred onto the top surface of the tray lift 28.

Next, the lower tray support frame 320 is moved backward so that the arms 321 and 322 are placed between the heating plates 110 and 120 of the press body 100. Then, the inner door 26 is closed. The hot pressing and the cold pressing are performed as above, while, by opening the outer door 23, the product P can be taken out, and a new product P to be pressed can be set on the tray T on the tray lift 28.

As described above, the press apparatus 1 in the present embodiment is capable of tandem press, that is, taking out the pressed product P and setting the new product P to be pressed while the hot pressing and cold pressing are performed.

In the first embodiment according to the present invention, as shown in FIGS. 10 and 11, each of the heating plate and cooling plate is provided with the heat medium pipeline and heat medium path for pressurizing and the heating plate cover or cooling plate cover fixed to the heating plate or cooling plate via the packing. However, the present invention is not limited to the above configuration, and various modifications may be applied. Hereinafter, a second embodiment according to the present invention will be described as one example of the modifications.

Figure 12:
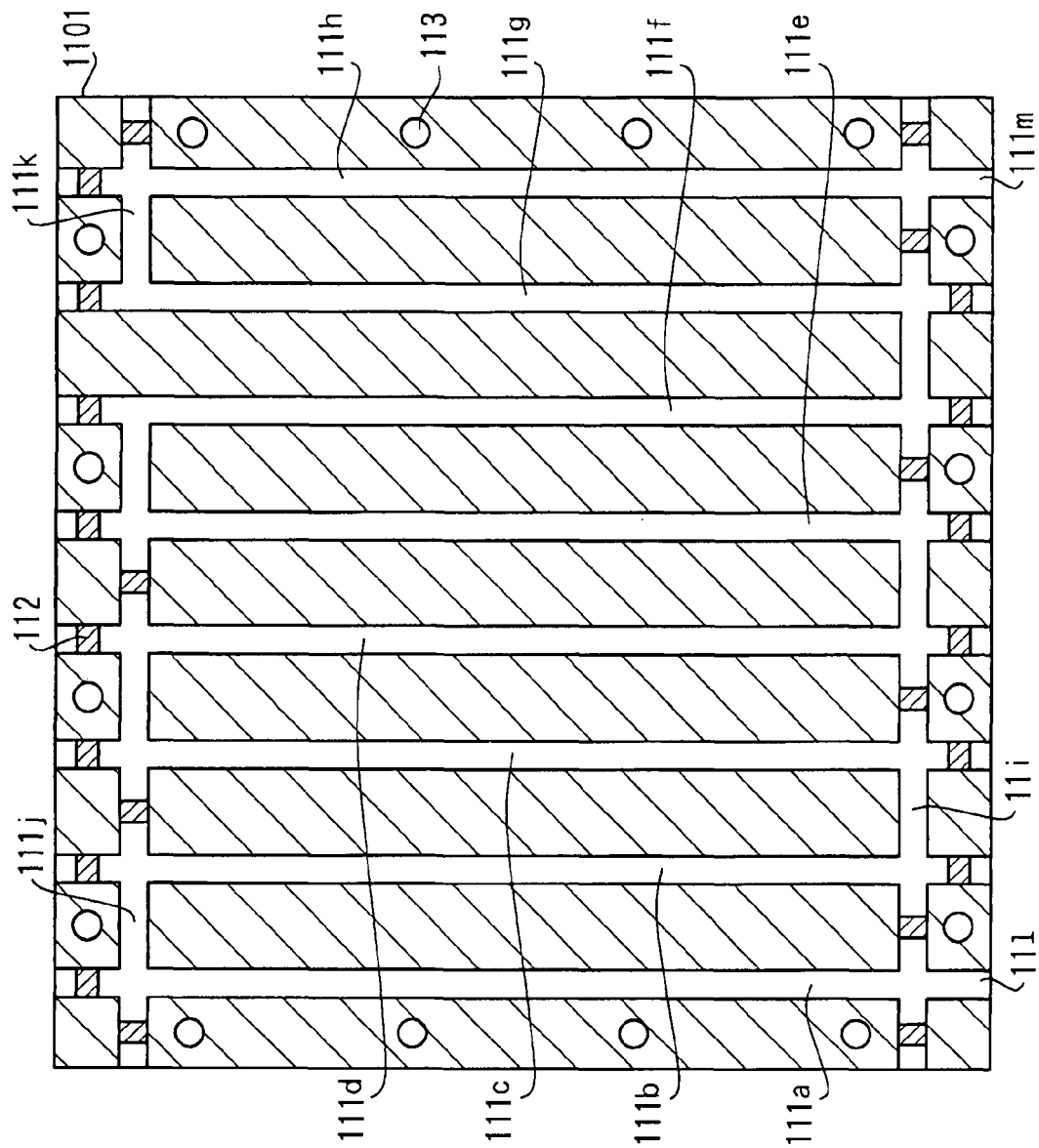
FIG. 12 is a cross-section view of a heat generating plate along a horizontal plane in a second embodiment according to the present invention.
Figure 13:
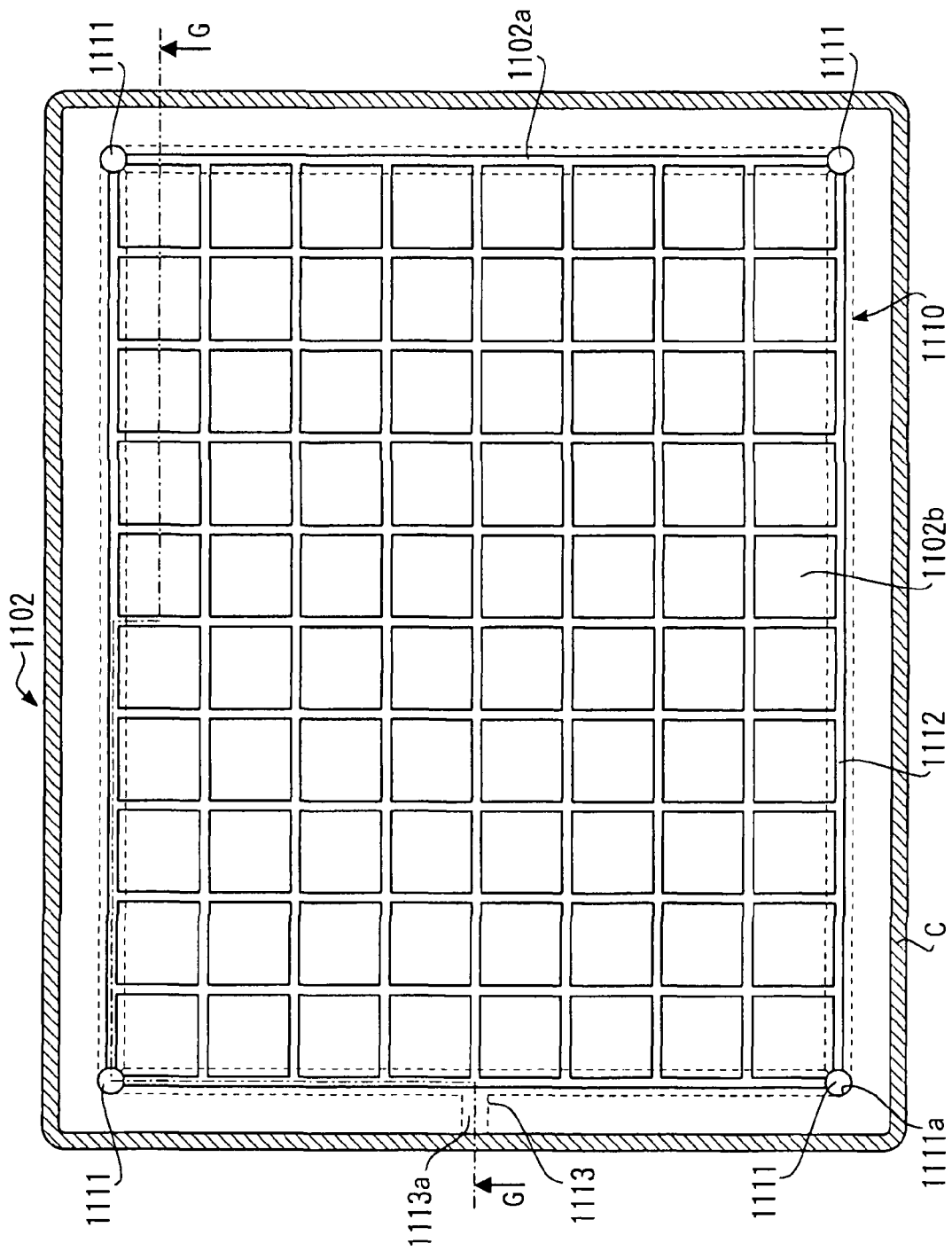
FIG. 13 is a bottom side view of a jacket jig in the second embodiment according to the present invention.
Figure 14:
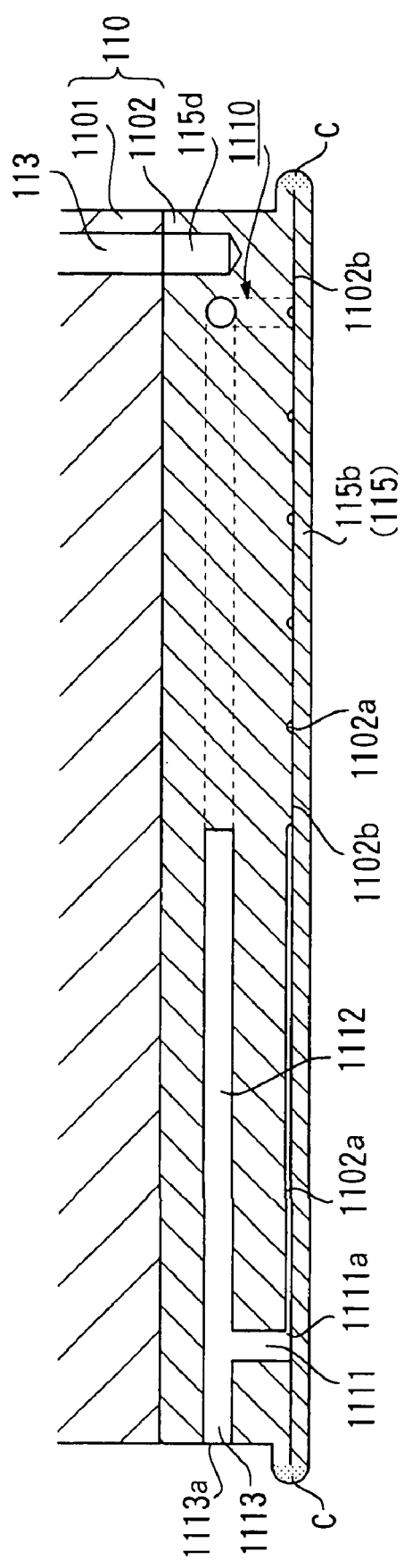
FIG. 14 is a cross-section taken along a line G-G in FIG. 13.

FIGS. 12 through 14 show a configuration of a heating plate or cooling plate of the press apparatus in the second embodiment. As shown in FIG. 14, the upper heating plate 110 of the present embodiment is provided with a heat generating plate 1101 and a jacket jig 1102 separable from the heating generating plate 1101. While the explanation hereinafter will be given based on the upper heating plate 110, the lower heating plate 120, the upper cooling plate 210 and lower cooling plate 220 have the same configuration as the upper heating plate 110.

The heat generating plate 1011 is a thick plate member having the heat medium pipeline for heating, which is the same as the first embodiment. The jacket jig 1102 is a plate member fixed so that one side of the jacket jig 1102 contacts with the heat generating plate 1101 and the other side of the jacket jig 1102 faces the heating plate cover 115. In the jacket jig 1102, the heat medium path for pressurizing is formed. It is noted that, in the present embodiment, the heating plate cover 115 is provided with only a metal plate 115b, and the frame 115a is not formed. Description of portions of the upper heating plate 110 other than the above structure, which are the same as the first embodiment, will be omitted here.

FIG. 12 is a cross-section view of the heat generating plate 1101 along a horizontal plane. The heat generating plate 1101 of the present embodiment is different from the upper heating plate 110 of the first embodiment in FIG. 11 in a point that the heat generating plate 1101 does not have the heat medium path for pressurizing.

FIG. 13 is a bottom view of the jacket jig 1102 in the second embodiment. As shown in FIG. 13, the jacket jig 1102 is provided with a plurality of grooves 1102a formed in a grid pattern on the bottom surface thereof. Additionally, the jacket jig 1102 is provided with holes 1111 formed (not to penetrate) from the bottom surface thereof in the vertical direction on its four corners. An opening 1111a on the bottom surface of the jacket jig 1102 of the hole 1111 is connected to the grooves 1102a. Further, the jacket jig 1102 is provided with a first side hole 1112 formed to connect the upper end of each of the four holes 1111, and a second side hole 1113 formed to diverge from the middle of one of the first side hole 1112 toward the side surface of the jacket jig 1102 in the horizontal direction. The holes 1111, the first side hole 1112 and the second side hole 1113 form a heat medium path 1110 for pressurizing, which leads from the side surface of the jacket jig 1102 to the bottom surface of the jacket jig 1102.

Additionally, an opening 1113a of the second side hole 1113 on the side surface of the jacket jig 1102 is connected to a pressure generator. The controller of the press apparatus 1 controls the pressure generator to change the pressure of the heat medium oil filling the heat medium path 1110. Incidentally, the entire marginal portion of the bottom surface of the jacket jig 1102 is welded with the metal plate 115b so that the leakage of the heat medium oil from between the jacket jig 1102 and the metal plate 115b is prevented. As described above, since the heat medium path 1110 for pressurizing is formed in the jacket jig 1102 in the present embodiment, the packing between the heating plate and the heating plate cover for sealing the oil as described in the first embodiment is not needed. Therefore, only the opening 1113a of the second side hole 1113 on the side surface of the jacket jig 1102 needs to be sealed. Consequently, a risk of oil leakage is reduced in the present embodiment.

FIG. 14 is a cross-section view of the heat generating plate 1101 and the jacket jig 1102 taken along a line G-G in FIG. 13. The heat generating plate 1101 is provided with a plurality of holes 113 penetrating the marginal portion of the heat generating plate 1101 in the vertical direction. The jacket jig 1102 is provided with a plurality of threaded holes 115d corresponding to the holes 113. The jacket jig 1102 is fixed to the heat generating plate 1102 by installing bolts (not shown) into the threaded holes 115d through the holes 113. Therefore, according to the present embodiment, the heat generating plate 1101 and the jacket jig 1102 are easily separated by unscrewing the bolts. Additionally, since there is no pipeline between the heat generating plate 1101 and the jacket jig 1102, the oil sealing between the heat generating plate 1101 and the jacket jig 1102 is not necessary. Therefore, when the metal plate 115b is damaged, the jacket jig 1102 can be easily exchanged and there is required no consideration for the oil sealing between the heat generating plate 1101 and the jacket jig 1102.

As shown in FIG. 14, flat portions 1102b (which are not grooved) on the bottom surface of the jacket jig 1102 contact with the top surface of the metal plate 115b. Therefore, when the heat medium oil is pressurized by controlling the pressure generator, the heat medium oil runs through the groove 1102a from the opening 1111a of the hole 1111 on the bottom surface of the jacket jig 1102, quickly spreading over the bottom surface of the jacket jig 1102. When a further pressure is applied to the heat medium oil in this situation, the heat medium oil fills a space between the flat portion 1102b of the bottom surface of the jacket jig 1102 and the metal plate 115b, and the metal plate is pressed downward. As described above, since the metal plate 115b is pressed downward after the heat medium oil spreads over the bottom surface of the jacket jig 1102 through the grooves 1102a, the pressure distribution on the metal plate 115b in the horizontal direction is substantially kept even.

In the above described first and second embodiments, the mechanism for keeping the heating plate or cooling plate flat by combining the metal plate and the heat medium oil is provided in each of the upper heating plate 110, lower heating plate 120, upper cooling plate 210 and lower cooling plate 220. However, the present invention is not limited to the above configuration, and such a mechanism may be provided only in the upper heating plate and cooling plate, or only in the lower heating plate and cooling plate. Additionally, in the above described first and second embodiments, the temperature of the heating plate or cooling plate is controlled by the heat medium pipeline for heating or cooling formed with eight through holes in parallel with each other and other holes connecting the through holes in the heating plate or cooling plate. However, the present invention is not limited to the above configuration and other shapes of heat medium pipeline capable of circulating the heat medium oil over the heating plate and cooling plates may be applied.

What is claimed is:

1. A press apparatus capable of hot pressing and cold pressing for a product, comprising:
    an upper heating plate;
    a lower heating plate, the upper and lower heating plates being arranged in a vertical direction to hot-press the product therebetween;
    a fixed platen to which the upper heating plate is fixed;
    a movable platen to which the lower heating plate is fixed;
    a movable platen driving unit configured to move the movable platen along the vertical direction with respect to the fixed platen;
    an upper cooling plate;
    a lower cooling plate, the upper and lower cooling plates being arranged in the vertical direction to cold-press the product therebetween;
    a cooling plate driving unit configured to move the upper and lower cooling plates in a horizontal direction between a first position for the cold pressing that is located between the upper and lower heating plates and a second position for the hot pressing that is located apart from the upper and lower heating plates in the horizontal direction; and
    a product transfer unit configured to transfer the product between the first position and a third position that is located at an opposite side of the second position with respect to the first position,
    wherein the product transfer unit includes two product transfer mechanisms such that a product before pressing is transferred from the third position to the first position while a product after pressing is transferred from the first position to the third position;
    a first section substantially kept in a vacuum state, in which the fixed platen, the movable platen, the upper and lower heating plates, the upper and lower cooling plates and the cooling plate driving mechanism are placed;
    a second section separated from the first section by an inner door;
    a barometrical pressure changing unit configured to change a barometrical pressure in the second section between an atmosphere pressure and a vacuum state; and
    a control unit configured to control the barometrical pressure changing unit, the inner door, and the product transfer mechanism, and
    wherein, when the product is placed in at least one of the first and second sections, the control device controls the barometrical pressure changing unit to depressurize the second section substantially to a vacuum state, the inner door to open, the product transfer mechanism to transfer the product between the first and second sections through the inner door, and then, the inner door to close.

2. The press apparatus according to claim 1,
    wherein the cooling plate driving unit includes upper and lower cooling plate driving mechanisms, each of which has a pair of arms movable between the first position and the second position, and
    wherein each of the upper and lower cooling plates is placed and carried on the pair of arms of each of the upper and lower cooling plate driving mechanisms.

3. The press apparatus according to claim 2,
    wherein each of the upper and lower cooling plate driving mechanisms is driven by a feed screw mechanism.

4. The press apparatus according to claim 3,
    wherein a feed screw in the feed screw mechanism and the pair of arms extend in the horizontal direction.

5. The press apparatus according to claim 4,
    wherein the arms of each pair are connected with each other via a connecting member,
    wherein one of the arms has a nut formed to be engaged with the feed screw,
    wherein the other arm has a bearing formed to be slidably engaged with a guide shaft placed parallel to the feed screw, and wherein the arms of each pair are connected with each other via the connecting member at edges of the arms at a side of the second position with respect to the first position.

6. The press apparatus according to claim 2,
wherein, when the movable platen driving unit moves the movable platen upward in a state of the upper and lower cooling plates in the first position, the product is cold-pressed between the upper and lower cooling plates,
wherein the lower cooling plate is lifted by the lower heating plate from beneath to be apart from the pair of arms of the lower cooling plate driving mechanism during the cold pressing, and
wherein the upper cooling plate is lifted by the lower cooling plate from beneath to be apart from the pair of arms of the upper cooling plate driving mechanism and get in contact with the upper heating plate during the cold pressing.

7. The press apparatus according to claim 1,
wherein each of the upper and lower cooling plates includes a plurality of distance bars, and
wherein the distance bars of the upper cooling plate establish contact with the distance bars of the lower cooling plate during the cold pressing, so that a distance between the upper and lower cooling plates can be kept constant.

8. The press apparatus according to claim 1,
wherein each of the fixed platen and the movable platen includes a plurality of distance bars, and
wherein the distance bars of the fixed platen establish contact with the distance bars of the movable platen during the hot pressing, so that a distance between the upper and lower heating plates can be kept constant.

9. The press apparatus according to claim 1,
wherein a heat insulating layer is provided on each a bottom surface of the lower cooling plate and a top surface of the upper cooling plate.

10. The press apparatus according to claim 1,
wherein the product before pressing is transferred from the third position to the first position by one of the product transfer mechanism, and
wherein the product after pressing is transferred from the first position to the third position by the other product transfer mechanism.

11. The press apparatus according to claim 10,
wherein the product transfer mechanisms includes an upper product transfer mechanism and a lower product transfer mechanism that are arranged in the vertical direction,
wherein the product before pressing is transferred by the upper product transfer mechanism, and
wherein the product after pressing is transferred by the lower product transfer mechanism.

12. The press apparatus according to claim 11,
wherein each of the upper and lower product transfer mechanisms includes a pair of arms movable between the first position and the third position, the pair of arms being configured to carry the product thereon,
wherein the product to be pressed is carried and pressed in a state placed on a tray supported by the pair of arms of the upper product transfer mechanism,
wherein the tray includes a plurality of projections that project along a second horizontal direction perpendicular to the horizontal direction, the pair of arms of the upper product transfer mechanism including a plurality of cutout portions that are recessed along the second horizontal direction, and wherein the pressed product on the tray is transferred from the upper product transfer mechanism to the lower product transfer mechanism by moving the pair of arms of the upper product transfer mechanism such that positions of the projections of the tray correspond to positions of the cutout portions of the pair of arms in the horizontal direction and by driving the movable platen driving device to move down the movable platen.

13. The press apparatus according to claim 1, configured to hot-press the product between the first and second heating plates heated to a molding temperature for the product, and further to cold-press the product between the first and second cooling plates kept at a temperature lower than the molding temperature.

14. The press apparatus according to claim 1, further comprising:
a metal plate fixed onto a product-side surface of at least one of the first and second heating plates with a predetermined space between the metal plate and the at least one of the first and second heating plates;
a heat medium filling the predetermined space between the metal plate and the at least one of the first and second heating plates; and
a heat medium pressure regulating unit configured to control a pressure of the heat medium.

15. The press apparatus according to claim 14,
wherein the heat medium pressure regulating unit controls the pressure of the heat medium to be substantially equal to a pressing pressure to the product.

16. The press apparatus according to claim 14, further comprising a heat medium path formed in the at least one of the first and second heating plates, the heat medium path having an opening connected to the heat medium pressure regulating unit, and
wherein the heat medium pressure regulating unit controls the pressure of the heat medium supplied via the heat medium path to fill the predetermined space between the metal plate and the at least one of the first and second heating plates.

17. The press apparatus according to claim 16,
wherein the at least one of the first and second heating plates includes a heat generator and a plate-shaped jacket jig configured to transfer the heat of the heat generator to the heat medium, a surface of the jacket jig being in contact with the heat generator,
wherein the heat medium path is formed in the jacket jig,
wherein a plurality of grooves are formed in a grid pattern on a surface of the at least one of the first and second heating plates,
wherein a part of the grooves is connected to an opening of the heat medium path, and
wherein, unless the heat medium is pressurized, the metal plate is in contact with the product-side surface of the at least one of the first and second heating plates.

18. The press apparatus according to claim 14,
wherein the metal plate is fixed to each of the first and second heating plates.

19. The press apparatus according to claim 1, further comprising:
a metal plate fixed onto a product-side surface of at least one of the first and second cooling plates with a predetermined space between the metal plate and the at least one of the first and second heating plates;
a heat medium filling the predetermined space between the metal plate and the at least one of the first and second cooling plates; and a heat medium pressure regulating unit configured to control a pressure of the heat medium.

20. The press apparatus according to claim 19,
wherein the heat medium pressure regulating unit controls the pressure of the heat medium to be substantially equal to a pressing pressure to the product.

21. The press apparatus according to claim 19, further comprising a heat medium path formed in the at least one of the first and second cooling plates, the heat medium path having an opening connected to the heat medium pressure regulating unit, and
wherein the heat medium pressure regulating unit controls the pressure of the heat medium supplied via the heat medium path to fill the predetermined space between the metal plate and the at least one of the first and second cooling plates.

22. The press apparatus according to claim 21 wherein the at least one of the first and second cooling plates includes a heat generator and a plate-shaped jacket jig configured to transfer the heat of the heat generator to the heat medium, a surface of the jacket jig being in contact with the heat generator,
wherein the heat medium path is formed in the jacket jig,
wherein a plurality of grooves are formed in a grid pattern on a surface of the at least one of the first and second cooling plates,
wherein a part of the grooves is connected to an opening of the heat medium path, and
wherein, unless the heat medium is pressurized, the metal plate is in contact with the product-side surface of the at least one of the first and second cooling plates.

23. The press apparatus according to claim 19,
wherein the metal plate is fixed to each of the first and second cooling plates.

* * * * *